United States Patent
Comer et al.

(10) Patent No.: US 12,347,180 B1
(45) Date of Patent: Jul. 1, 2025

(54) SYSTEM AND METHOD FOR PATTERN RECOGNITION AND GRAPH EXTRACTION FOR DATA COLLECTED FROM GATE-DEFINED SEMICONDUCTOR QUANTUM DOTS

(71) Applicant: HRL Laboratories, LLC, Malibu, CA (US)

(72) Inventors: Joseph Comer, Portland, OR (US); Reed Andrews, Port Hueneme, CA (US); Ian Jenkins, Westlake Village, CA (US); Parker Williams, Calabasas, CA (US); Heiko Hoffmann, Simi Valley, CA (US); Wyatt Mcallister, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 362 days.

(21) Appl. No.: 18/115,549

(22) Filed: Feb. 28, 2023

Related U.S. Application Data (60) Provisional application No. 63/315,907, filed on Mar. 2, 2022.

(51) Int. Cl.
  *G06V 10/84* (2022.01)
  *G06V 10/75* (2022.01)
  *G06V 10/82* (2022.01)

(52) U.S. Cl.
  CPC ............ *G06V 10/84* (2022.01); *G06V 10/751* (2022.01); *G06V 10/82* (2022.01)

(58) Field of Classification Search
  USPC .................................................. 382/155–156
  See application file for complete search history.

(56) References Cited

U.S. PATENT DOCUMENTS

| | | | | |
|---|---|---|---|---|
| 2012/0262610 | A1* | 10/2012 | Rissa | H04N 23/84 348/E9.003 |
| 2018/0165595 | A1* | 6/2018 | Ahn | G06N 20/00 |
| 2019/0294970 | A1* | 9/2019 | Fidler | G06N 3/044 |
| 2020/0249684 | A1* | 8/2020 | Onofrio | G08G 1/167 |

(Continued)

OTHER PUBLICATIONS

Kalantre et al., Machine learning technique for state recognition and auto-tuning in quantum dots, arXiv: 1712.04914v2 [quant-ph], Feb. 15, 2018, pp. 1-15 (Year: 2018).*

(Continued)

*Primary Examiner* — Ishrat I Sherali
(74) *Attorney, Agent, or Firm* — TOPE-MCKAY & ASSOCIATES (57) ABSTRACT

Described is a system for pattern recognition and graph extraction. The system operates by obtaining data from a quantum dot device having gate defined semiconductor quantum dots. An image with pixel-level coordinates is then generated from the data. Ground truth graph annotations are received of the image. A deep network processes the image and pixel-level coordinates to generate a predicted graph. The predicted graph is compared to the graph annotations to generate a loss, which allows the deep network to be optimized by updating parameters in the deep network based on the loss. The image with pixel-level coordinates is then used to generate an optimized predicted graph, which allows for identifying operational voltages to apply to the quantum dot device.

6 Claims, 11 Drawing Sheets

(56) References Cited

U.S. PATENT DOCUMENTS

| | | | |
|---|---|---|---|
| 2021/0192768 A1* | 6/2021 | Tran | G06V 10/82 |
| 2022/0076432 A1* | 3/2022 | Ramezani | G06N 3/044 |
| 2022/0083850 A1* | 3/2022 | Thomas | H10F 30/28 |
| 2022/0164585 A1* | 5/2022 | Ayvaci | G06N 3/088 |
| 2022/0208355 A1* | 6/2022 | Li | G06T 7/174 |
| 2023/0274136 A1* | 8/2023 | Zwolak | G06N 10/40 |
| | | | 706/25 |

OTHER PUBLICATIONS

Wang, J., Sun, K., Cheng, T., Jiang, B., Deng, C., Zhao, Y., Liu, D., Mu, Y., Tan, M., Wang, X., Liu, W., & Xiao, B. (2021), "Deep High-Resolution Representation Learning for Visual Recognition," IEEE Transactions on Pattern Analysis and Machine Intelligence, 43, pp. 3349-3364.

* cited by examiner

- △ Predicted key point class 1
- ★ Predicted key point class 2
- —— Predicted edge class 1
- ·········· Predicted edge class 2

SYSTEM AND METHOD FOR PATTERN RECOGNITION AND GRAPH EXTRACTION FOR DATA COLLECTED FROM GATE-DEFINED SEMICONDUCTOR QUANTUM DOTS

CROSS-REFERENCE TO RELATED APPLICATIONS

This application claims the benefit of and is a non-provisional patent application of U.S. Provisional Application No. 63/315,907, filed on Mar. 2, 2022, the entirety of which is hereby incorporated by reference.

BACKGROUND OF INVENTION

(1) Field of Invention

The present invention generally relates to an image processing system and, more specifically, to a system and method for pattern recognition and graph extraction for data collected from gate-defined semiconductor quantum dots.

(2) Description of Related Art

Machine learning systems, such as those used in image processing, typically use structure and patterns to identify objects and other items. Existing systems use key points in the image, instead of edges, to encode long range structure and patterns. By way of example, HRNet and associated datasets are used to identify individual key points in images. See, for example, Wang, J., Sun, K., Cheng, T., Jiang, B., Deng, C., Zhao, Y., Liu, D., Mu, Y., Tan, M., Wang, X., Liu, W., & Xiao, B. (2021), "Deep High-Resolution Representation Learning for Visual Recognition," IEEE Transactions on Pattern Analysis and Machine Intelligence, 43, 3349-3364, the entirety of which is incorporated herein by reference. Thus and as noted above, existing prior art focuses on collections of key points (or vertices) and not the relationships between them. Without a coordinate system and labels that encode the long-range patterns, the existing labelling and training methodology is inefficient and results in poor pattern recognition, notably in the low-data regime.

Existing systems do not include structural relationships between key points since such a system requires several non-trivial steps that have not heretofore been conceived, including (1) identifying and including a coordinate system with images; this can involve changing how data is collected and stored, a major step in data-driven machine learning algorithms; (2) adding annotations between key points to indicate edges; this involves altering how data are labeled, which is a major alteration from traditional machine learning pipelines; and (3) including a loss that makes use of the structural relationship between key points. To incorporate those processes into a single system requires major redesigns of data processing and training methods, and developing a suitable loss requires extensive innovation and experience in machine learning.

Thus, a continuing need exists for a system for pattern recognition and graph extraction for data collected from gate-defined semiconductor quantum dots that incorporates and solves the aforementioned processes and issues.

SUMMARY OF INVENTION

The present disclosure provides a system for pattern recognition and graph extraction. In one aspect, the system comprises one or more processors and associated memory. The memory is a non-transitory computer-readable medium having executable instructions encoded thereon, such that upon execution of the instructions, the one or more processors perform several operations, including obtaining data from a quantum dot device having gate defined semiconductor quantum dots; generating an image with pixel-level coordinates from the data; receiving ground truth graph annotations of the image; processing, with a deep network, the image and pixel-level coordinates to generate a predicted graph; comparing the predicted graph to the graph annotations to generate a loss; and optimizing the deep network by updating parameters in the deep network based on the loss.

In yet another aspect, the system further performs operations of processing, with the optimized deep network, the image with pixel-level coordinates to generate an optimized predicted graph; identifying, with the optimized predicted graph, operational voltages to apply to the quantum dot device; and applying the operational voltages to the quantum dot device.

In another aspect, the operational voltages as applied to the quantum dot device are adjusted to bias for usage as a spin qubit.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention generally relates to an image processing system and, more specifically, to system and method for pattern recognition and graph extraction for data collected from gate-defined semiconductor quantum dots. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112(f).

Before describing the invention in detail, first a description of the various principal aspects of the present invention is provided. Subsequently, an introduction provides the reader with a general understanding of the present invention. Finally, specific details of various embodiment of the present invention are provided to give an understanding of the specific aspects.

(1) Principal Aspects

Various embodiments of the invention include three "principal" aspects. The first is a system for pattern recognition and graph extraction for data collected from gate-defined semiconductor quantum dots. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
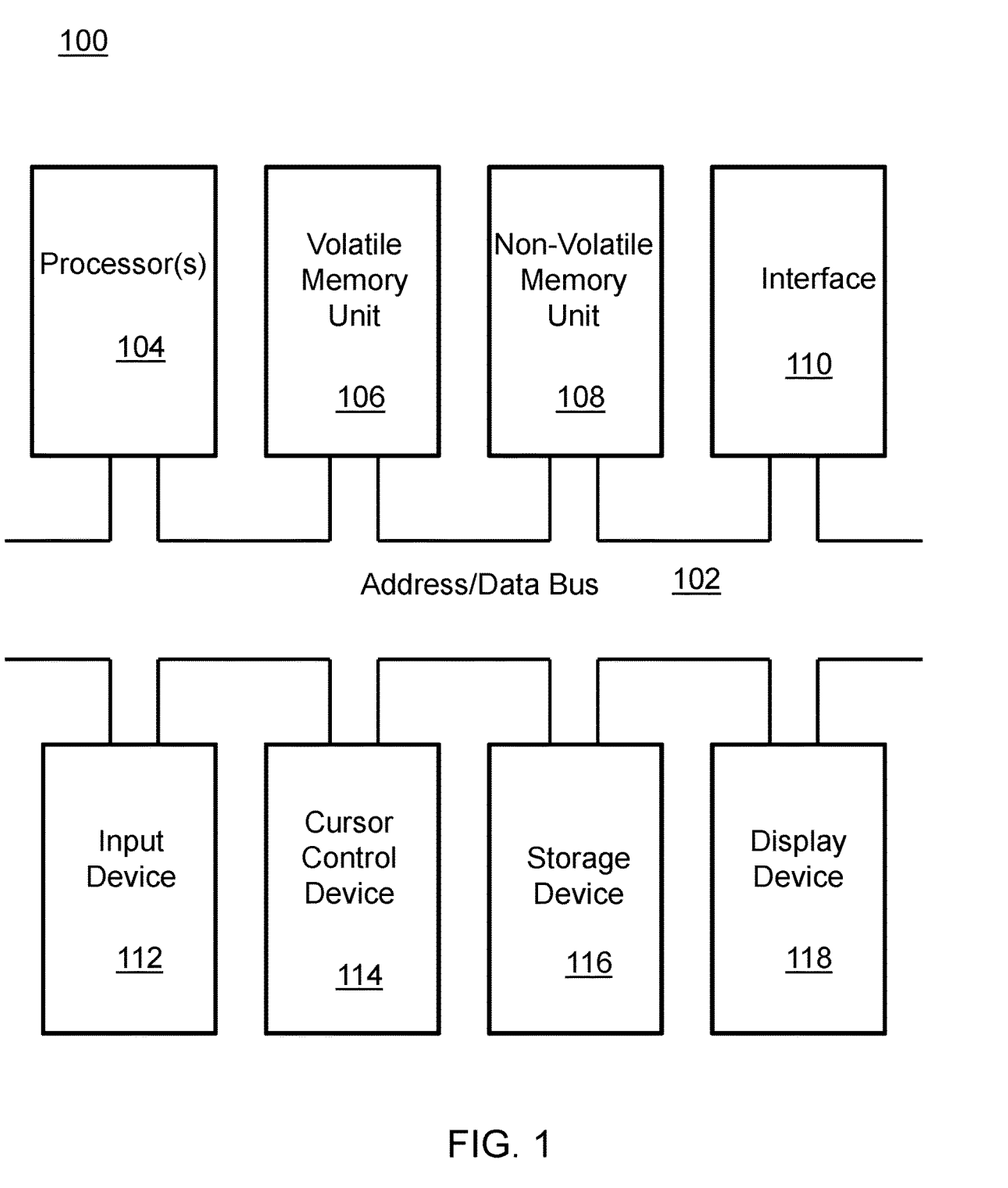
FIG. 1 is a block diagram depicting the components of a system according to various embodiments of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. In various aspects, the computer system 100 can be embodied in any device(s) that operates to perform the functions as described herein as applicable to the particular application, such as a desktop computer, a mobile or smart phone, a tablet computer, a computer embodied in a mobile platform, or any other device or devices that can individually and/or collectively execute the instructions to perform the related operations/processes.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA) or any other processing component operable for performing the relevant operations.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology. Further, one or more processors 104 (or devices, such as autonomous platforms) can be associated with one or more associated memories, where each associated memory is a non-transitory computer-readable medium. Each associated memory can be associated with a single processor 104 (or device), or a network of interacting processors 104 (or devices), such as a network of autonomous platforms (e.g., autonomous vehicles or platforms that incorporate the system of the present invention).

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components, and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
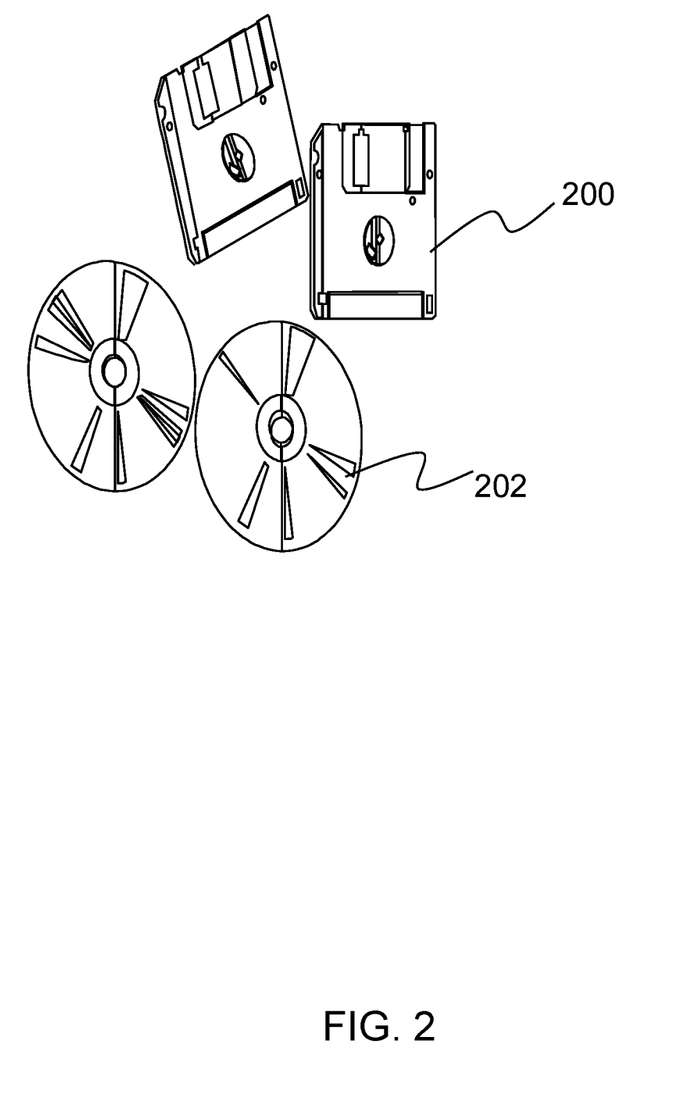
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

The present disclosure provides a system and method for pattern recognition and graph extraction for data collected from gate-defined semiconductor quantum dots. The disclosure provides a process for imbuing structural information into machine-learning-based image processing systems by leveraging long range structure and patterns present in the data. Notably, the present disclosure provides two primary components, including specific annotations and long-range loss. First, specific annotations are added to a subset of the data-of-interest (these data will be used to train the image processing system). These specific annotations consist of per-pixel spatial coordinates and of adjacency matrices that link key points within an image together to form edges. The second component involves a long-range loss in which the predictions of the image processing network are compared to the annotations. Each edge in the predicted graph is modeled as a spring with a (possibly unique) spring constant k. The loss is calculated as the total energy of displacement of all edges (or springs) in the graph relative to the ground-truth lengths of edges between connected vertices according to the provided adjacency matrices. Combined, these components imbue machine-learning-based processing systems with information about the long-range patterns in the data.

The process as described in the present disclosure improves upon existing key point detection systems by leveraging long range structure and patterns in addition to the local feature information used commonly in convolutional neural network (CNN)-based key point detection and processing methods. The unique labelling and loss components provide a significant performance boost when applied to data from simulated electrical measurements of gate defined semiconductor quantum dots. Additionally, the experimental results show a drastic improvement in the low-data regime over a state-of-the-art baseline designed for key point prediction. Key points are labeled within the training data with both location and class as part of the annotation step. The key points are not necessarily for object classification; however, they align with a class structure that corresponds to components within the objects of interest.

As can be appreciated by those skilled in the art, the system and method as described herein has several practical applications in which it can be implemented. For example, the method can be employed in automated graph extraction for data collected from gate-defined semiconductor quantum dots. The process can also be implemented in automated quality control. For example, the system can be used for defect detection, allow for faster setup with fewer training samples. When applied to autonomous systems, the system allows for enhanced detection and classification of surrounding objects. Further details are provided below.

(3) Specific Details of Various Embodiments

Figure 3:
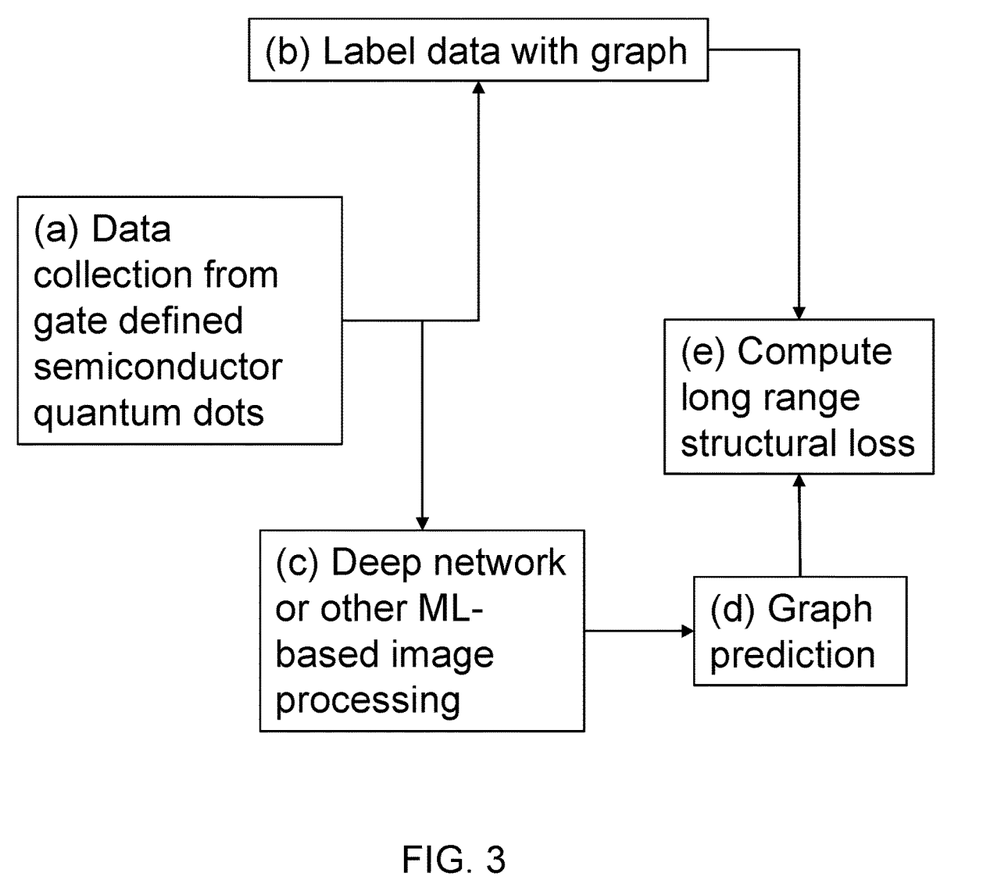
FIG. 3 is a flow chart depicting steps involved in creating image analysis algorithms that use long range structure and patterns.

As noted above, the present disclosure provides a system for pattern recognition and graph extraction. As shown in FIG. 3, the process includes a series of steps in image analysis algorithms that use long range structure and patterns. All steps are needed for training a machine learning (ML) algorithm, while only steps (a), (c) and (d) are needed when processing new data with a previously trained ML algorithm.

Figure 4A:
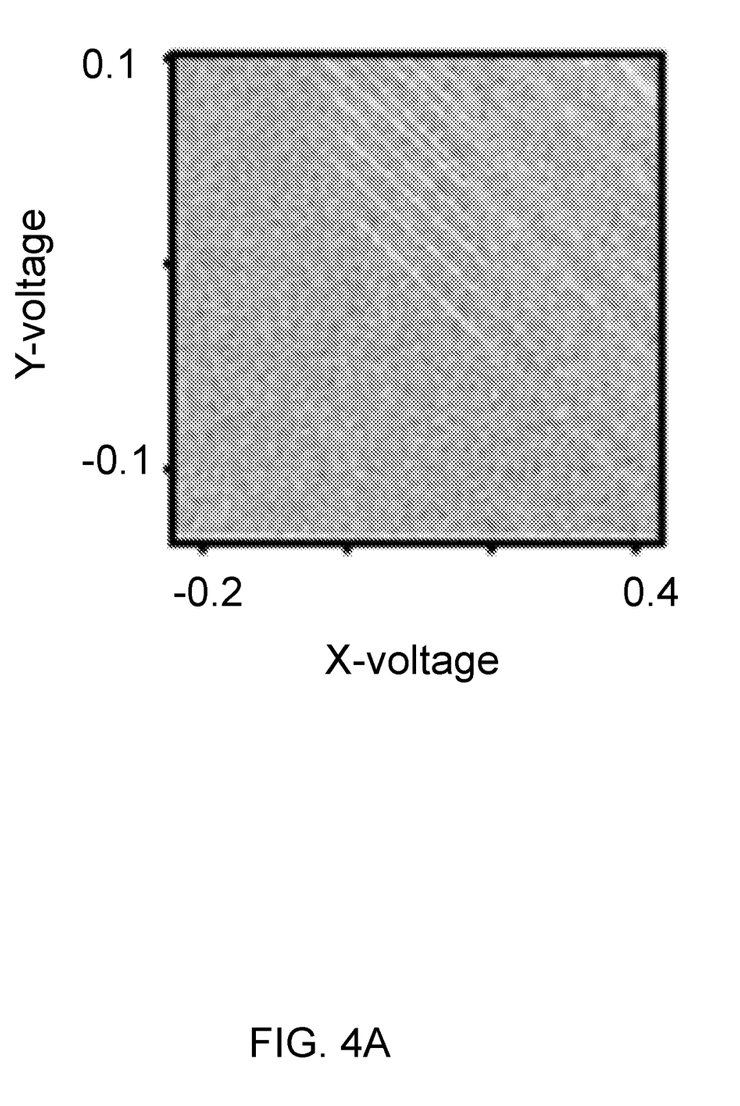
FIG. 4A is a graph depicting simulated data from measurements of gate defined semiconductor quantum dots.

The first step, Step (a), involves collecting data from gate-defined semiconductor quantum dots. Step (a) results in a set of data arranged on a grid (as an image) where each pixel of an image is associated with a set of voltages that were applied to the quantum dot device as the image was generated. Each pixel represents a current value, with the data on a grid being depicted as an image. In other words, the image is generated by applied voltages to a semiconductor device (e.g., such as a transistor) and measuring the resulting current flow. The current flow that is measured for a set of applied voltages corresponds to the grayscale value in the image. FIG. 4A is a graph (image) depicting an example synthetic result of the data collection step, depicting simulated data from measurements of gate defined semiconductor quantum dots. Measurements are made on a grid, resulting in a grayscale image. Crucially, each pixel is associated with two values, as indicated by the x- and y-axes. These values are the coordinates associated with the pixel. In other words, the x and y-axes depict two voltages applied to the quantum dot device, and the grayscale pixel shows the current measured when those voltages are applied.

Figure 4B:
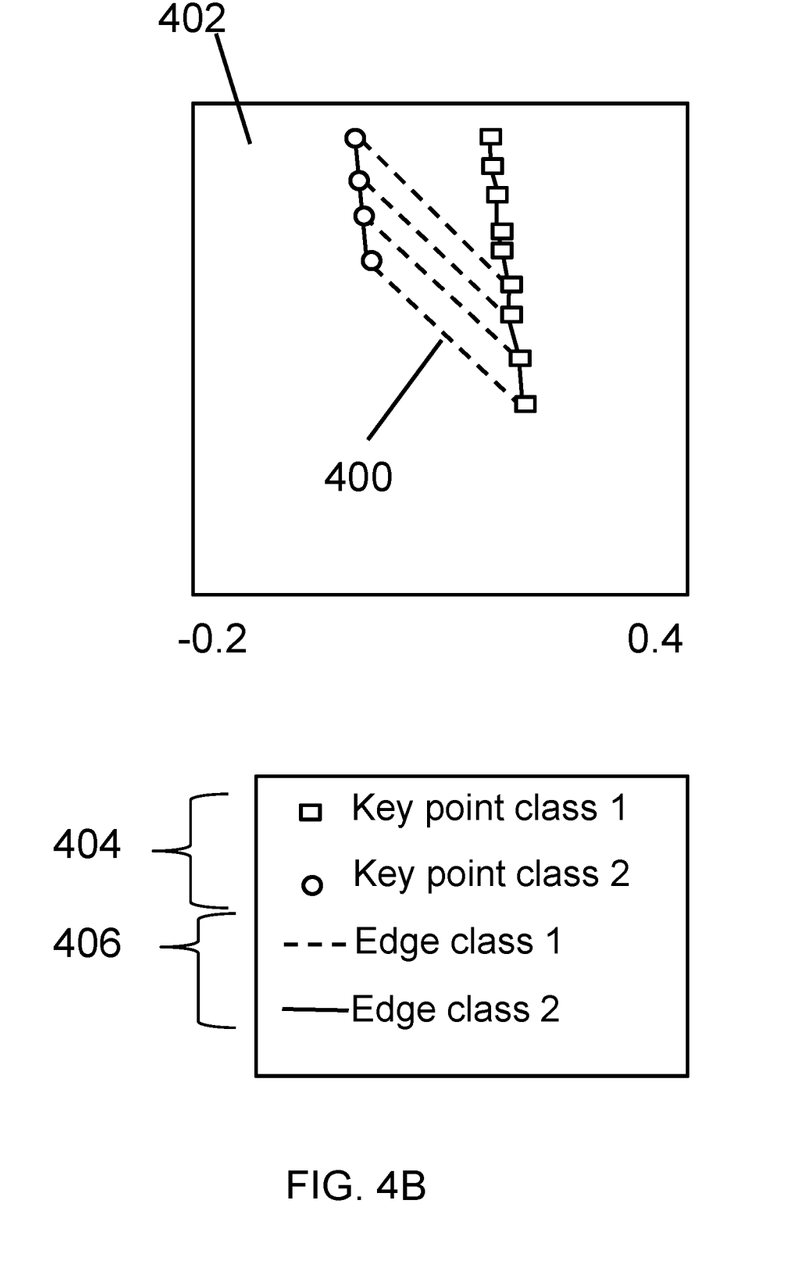
FIG. 4B is a graph depicting a visualization of example annotations that indicates key points and their relationships.
Figure 4C:
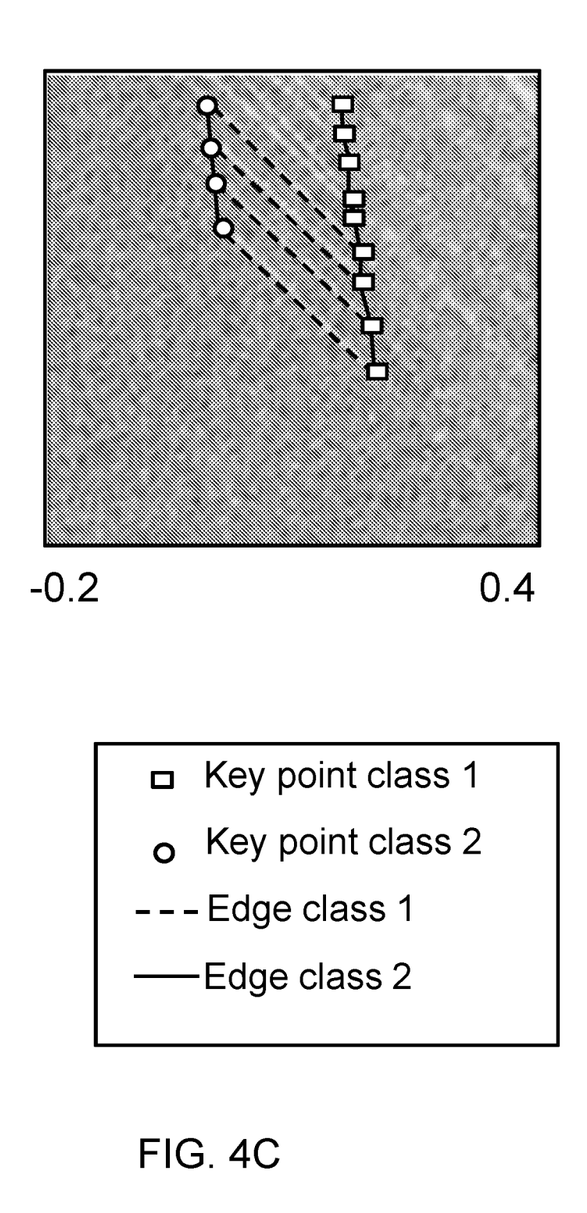
FIG. 4C is a graph depicting ground truth annotations and important features.

Step (b) involves labeling a portion of the collected data with annotations that represent graphs. FIG. 4B provides an illustration depicting a visualization of an example annotation 402 that indicates key points and their relationships. These data are stored in two matrices: One for storing key point and location information, which has dimension [number of key points, number of key point classes+2], and another for storing edge information, which has dimension [number of key points, number of key points, number of edge classes]. Note that +2 represents the x- and y-location of the key point. The annotation 402 marks key points 404 that are present in the image, and these points can be of different 'classes' which are visualized as different colors or other indicia. The key points typically correspond to a noticeable feature in the image. Crucially, the annotation 402 also includes edges 406 that are used to indicate how key points 404 relate to each other. These edges 406 are visualized as lines in FIG. 4B; edges 406 can have different 'classes' and are visualized as different colors or other indicia. Edges 406 are chosen to emphasize the structure and patterns present in the image, and represent the long range structure and patterns that are desired as an output of the data processing algorithm. For further understanding, FIG. 4C provides an illustration depicting an overlay of an example image and the annotation generated above.

Step (c) and (d) involve processing the data and coordinates (e.g., the image and coordinates of FIG. 4A as an input) with a deep neural network or other training algorithm to generate a graph that contains key points and edges (e.g., such as that shown in FIG. 4B). The output of this deep neural network is a predicted graph, and specifically contains two matrices. One matrix has dimensions [number of predicted key points, number of key point classes+2] that represents the class of the key point and its location. Note that +2 represents the x- and y-location of the key point. The null class is included in the "number of key point classes". Importantly, one of the classes can be a 'null class' which indicates no key point is present. The second matrix has dimensions [number of predicted key points, number of predicted key points, number of edge classes] that represents the predicted edges. Similarly to the key point classes, one of the edge classes is the 'null class' to allow for no edge. No particular deep network or processing method is necessary for this step, so long as it produces predictions that contain key points and edges.

It should be noted that although Step (c) and (d) are depicted as two separate steps, they can be condensed to a single step; nevertheless, the output of Step (c) are the feature maps of a typical convolutional neural network, and this feeds the graph prediction step (i.e., Step (d)) that processes these features into a predicted graph.

For clarity, in one aspect, the image is first processed with a convolutional neural network, resulting in a set of feature vectors. As one example implementation, a neural network can be used that is based on the common resnet-18 architecture. In this aspect, the neural network applies a series of two-dimensional (2D) filters to the image and reduces the resolution of the input image. The output of this processing step (i.e., Step (c)) is a set of pixels that have been filtered. In some aspects, a typical black a white (i.e., grayscale) pixel consists of 8 bits, which 256 values. Each pixel in this disclosure represents an electrical current value, whose magnitude could reasonably be represented by one of the 256 values. The output of the convolutional processing step (i.e., Step (c)) gives each pixel much more channel information, but reduces the spatial information (e.g., image is reduced to 16×16). The output feature vectors are then assigned information regarding their position: the x- and y-voltages associated with each pixel (as shown in FIG. 4A) are then added to the 256-dimensional vector. These coordinate-augmented feature vectors are then processed with a decoder from the commonly used transformer architecture used in natural language processing. The output of the transformer is a set of refined feature vectors that maintain the input dimensionality. These feature vectors are processed using a self-similarity to create the matrix that represents 'edges', and the feature vectors are separated processed to create the matrix of 'vertices'/'key points'. Thus, Step (d) includes applying the decoder and the final processing to generate the predicted graph, such as that depicted in FIG. 4B.

Figure 5A:
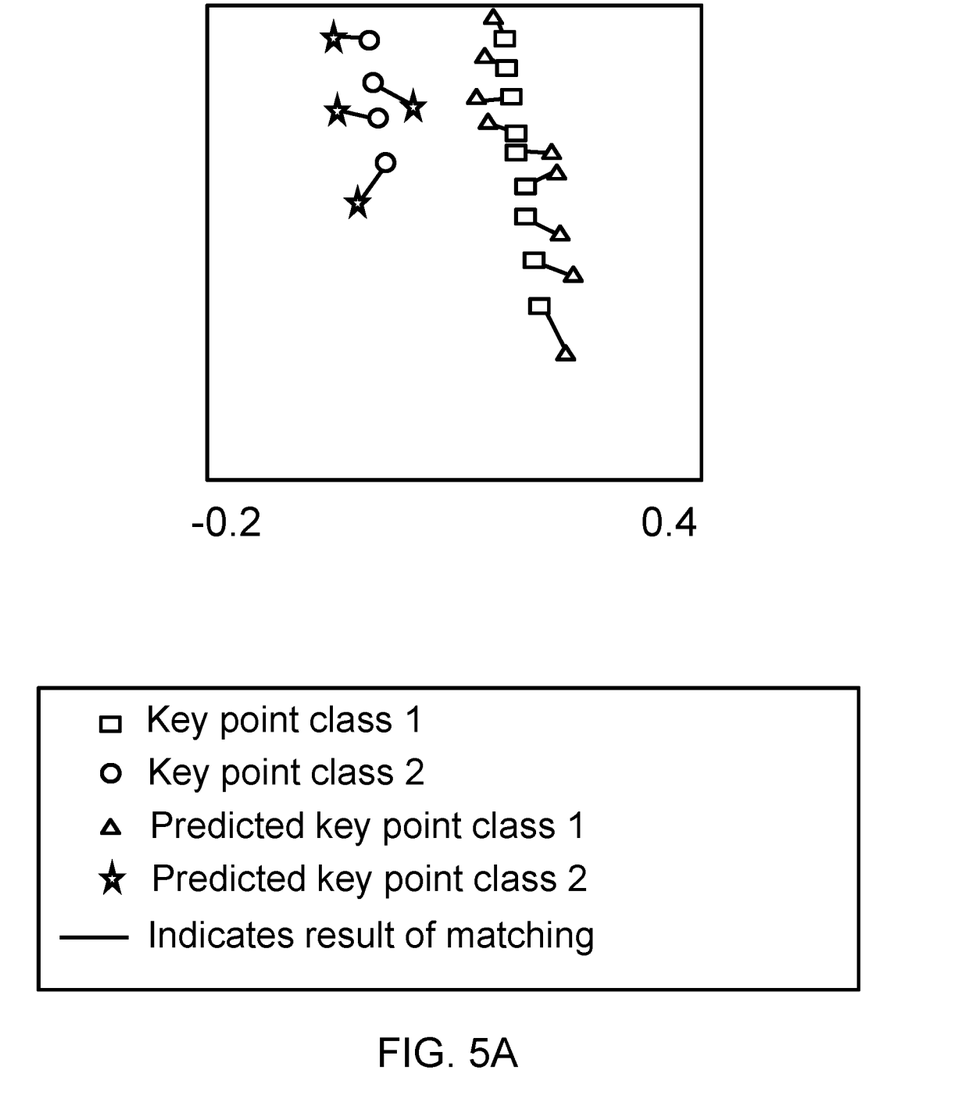
FIG. 5A is a graph depicting the matching process where each predicted key point is uniquely matched to a key point in the annotation.

Step (e) involves comparing the predicted graph to the annotation (i.e., from Step (b)) to generate a loss that can be used to update parameters in the deep neural network. This comparison involves two sub-steps. First, the predicted key points are uniquely matched to key points in the label using a bipartite matching algorithm, such as the Hungarian algorithm. The matching occurs based on class of the predicted and labeled key points, but also on distance away in coordinate space. A visualization of this matching is shown in FIG. 5A. The squared distance between the location of a predicted key point (indicated as y) and a label key point (indicated as x) is calculated and used as a loss. For example, the squared distance or loss (L) can be calculated as follows:

$L = \Sigma \|y_i - x_i\|_2^2$, where $i \in$ vertices, and where subscript 2 denotes a metric, referring to Euclidian distance.

Figure 5B:
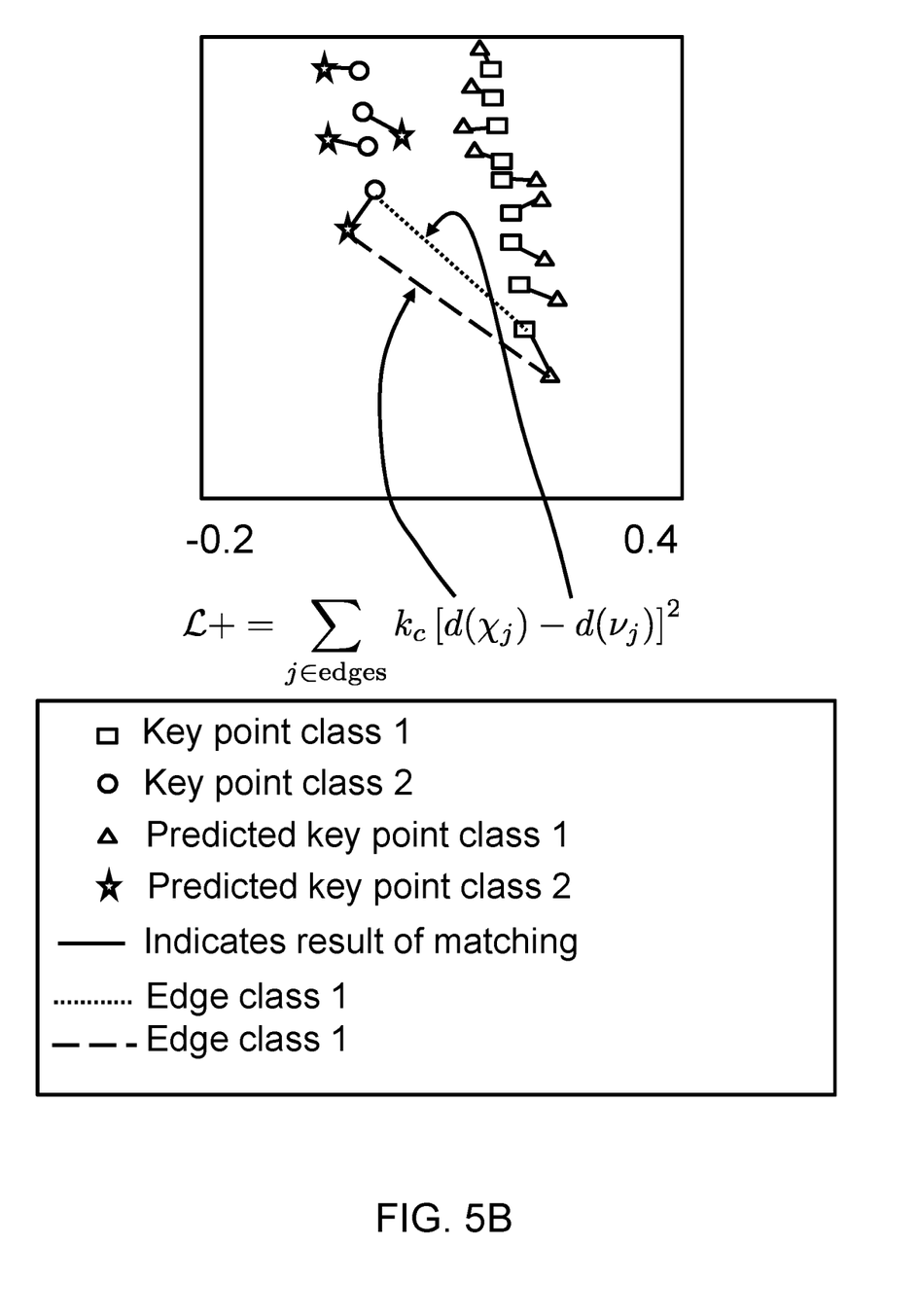
FIG. 5B is a graph depicting that if an edge is predicted between two key points, the length of the edge is compared to the distance between key points in the ground truth annotations.
Figure 5C:
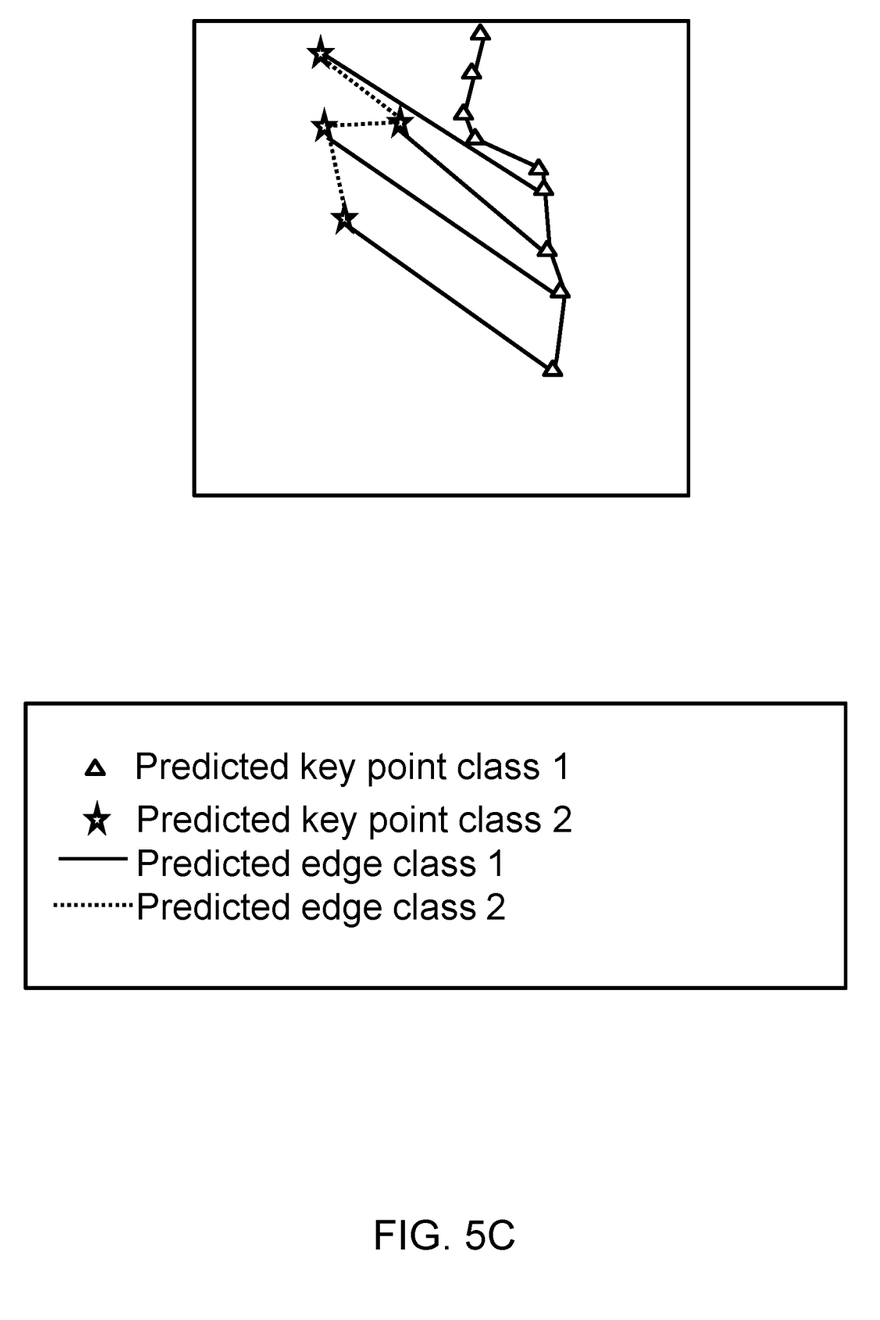
FIG. 5C is a graph depicting that the additional loss can be viewed as the energy required to deform the predicted graph to the ground truth annotation when treating each predicted edge as a spring with an associated spring constant and rest length.

Once matching occurs, the second sub-step begins. If two predicted key points are connected with an edge in the prediction, an additional loss is calculated as $k_c(d_2-d_1)^2$, where $k_c$ is the spring constant associated with edge class c, $d_1$ is the actual length of the edge of the annotation in coordinate space, and $d_2$ is the predicted length of the edge in coordinate space; this loss is also indicated in FIG. 5B. If an edge is predicted between two key points, the length of the edge is compared to the distance between key points in the ground truth annotations (e.g., ground truth annotations are labeled by a user operator). The total energy loss of the graph is the sum of this 'spring loss' for each predicted edge. Informally, this loss treats the edges as a collection of springs, and these springs are deformed so that the predicted graph matches the label; see FIG. 5C (To be clear, the predicted graph is deformed to that shown in FIG. 4C). While nothing is actually deformed, the predicted graph is referred to as being "deformed" for illustrative purposes to demonstrate what the additional loss physically means; thus, the predicted graph is deformed the ground-truth graph assuming that the edges are like springs, and the energy required to make this deformation is recorded. Further, the additional loss can be viewed as the energy required to deform the predicted graph to the ground truth annotation when treating each predicted edge as a spring with an associated spring constant and rest length. In other words, the additional loss represents the total energy of this deformation of the predicted graph.

Once a loss is generated, the deep network is updated using standard backpropagation algorithms and optimizers. Such updating steps are commonly understood by those skilled in the art of computer vision and machine learning. Nevertheless, the gradient of the loss (calculated from the edge energy) is calculated for every parameter used in the deep network; then, the parameter is adjusted by an amount corresponding to the magnitude of the gradient. This optimization results in a deep network that takes in images and produces optimized or additional predicted graphs that represent key points and the relationships between them.

The resulting information that is generated using the process above can be used to intelligently alter voltages applied to the quantum dot device. Operation of a quantum dot device requires intelligently altering many (>10) independently adjustable voltages. The optimized predicted graph can be processed to identify appropriate operational voltages, which can then be applied to the quantum dot device. For example, the optimized predicted graph can be processed to find the voltage midway between the lowest points that share an edge (this is a point that corresponds to the midpoint of the diagonal line 400 between the two lowest key points in FIG. 4B). This process corresponds to a specific charge occupation and coupling—essentially a physically-meaningful set of voltages at which to set the quantum dot device. The optimized predicted graph also allows a suite of other physically-meaningful voltages to be identified and then applied to the quantum dot device. The final result of this process is a system or processor that intelligently applies voltages to quantum dot devices. It should be understood that there are many voltages that can be applied to a quantum dot device, depending on its layout and how it is being operated. Thus, the x- and y-voltages of FIG. 4A are two such voltages, but there may be other voltages (not displayed in the image) that are simultaneously applied to the device. In one aspect, the disclosed system can automatically adjust those other voltages in order to optimize the appearance of the x-, y-voltage sweep of FIG. 4A. In particular, the optimized deep network produces an optimized predicted graph (containing key points and vertices), and this predicted graph can be combined with this level instructions (such as identify a 1-electron charge state) to identify the needed operational voltages which can then be applied to the quantum dot device.

(4) Experimental Results

To illustrate the performance benefits of the process of the present disclosure, a graph detection network was trained using the steps described above with synthetic data from gate-defined semiconductor quantum dots. After training, the performance of the system was evaluated using data unseen during training. An F1 score was used to quantify performance, while a threshold for key point detection of 5 mV was used. That is, a prediction is considered 'correct' if it is within 5 mV of its associated key point in the ground truth and has the same class.

Figure 6:
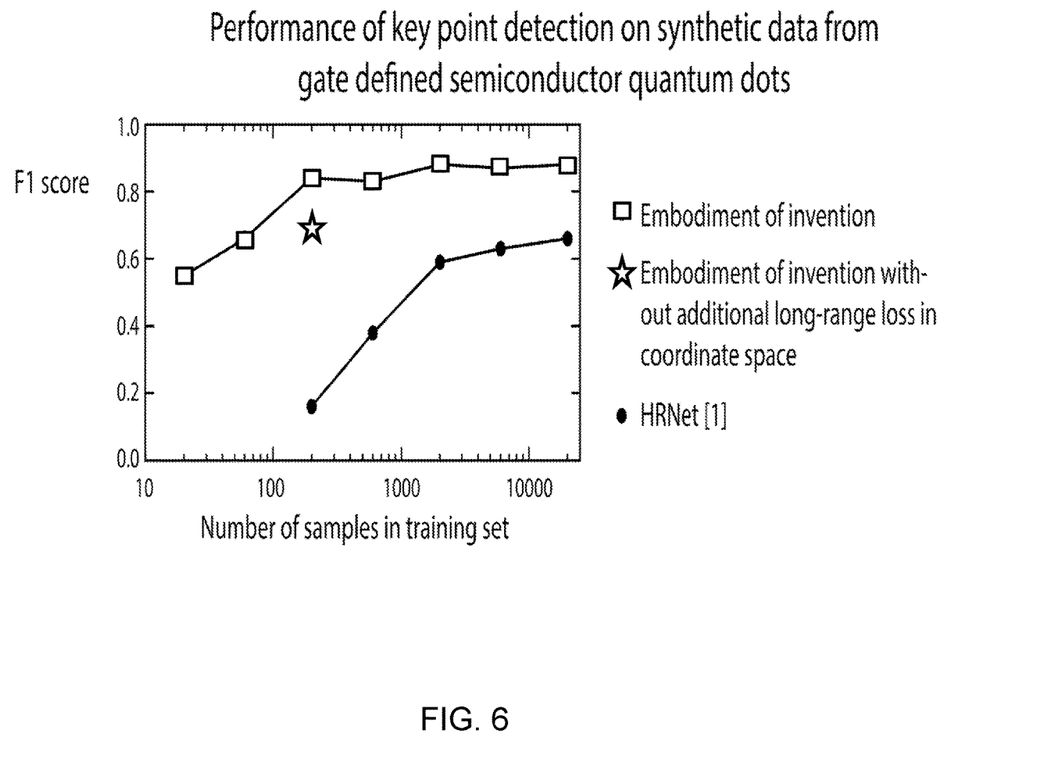
FIG. 6 is graph depicting results using the system of the present disclosure as compared to that of the prior art.

FIG. 6 presents the results. The embodiment of the present disclosure outperformed the prior art, HRNet, particularly in the low data regime in which few samples are used to train the key point detection network. Importantly, when the additional loss created from predicted edges is removed from an embodiment of the present disclosure, a significant performance drop of 0.15 was seen in the validation F1 score (although this is still an improvement over prior art on these data).

(5) Control of a Device

Figure 7:
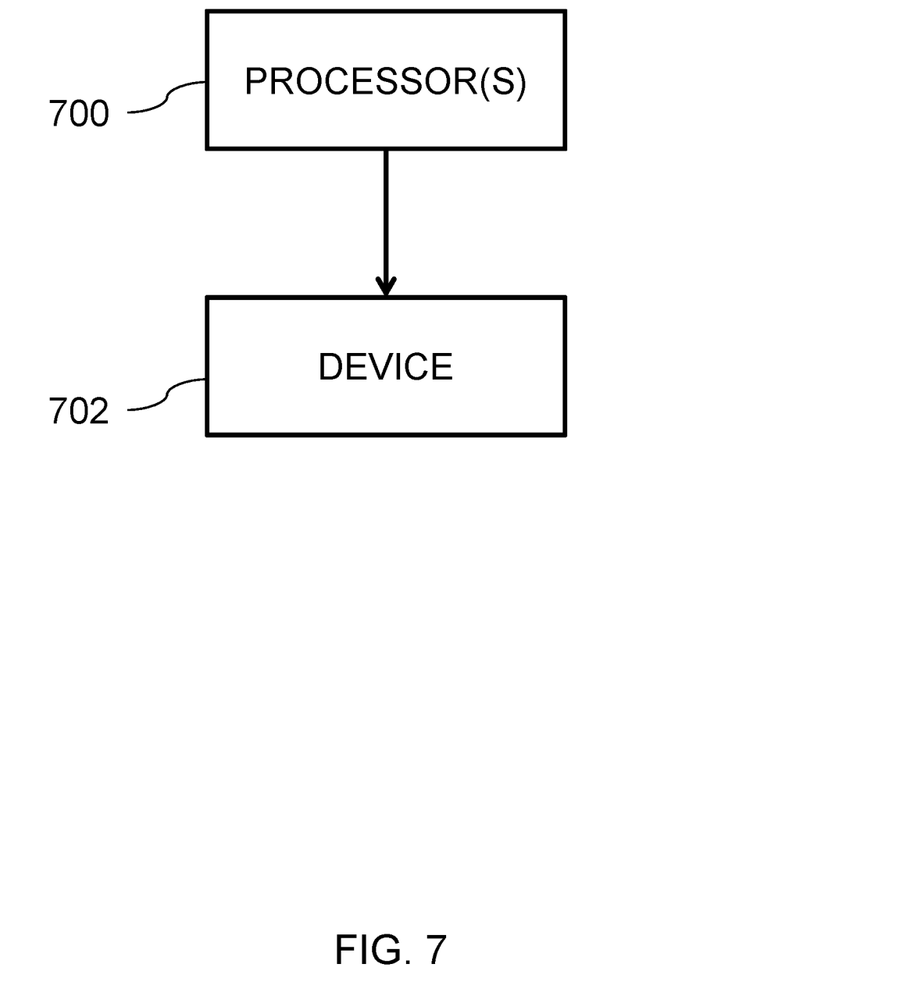
FIG. 7 is a block diagram depicting control of a device according to various embodiments.

As shown in FIG. 7, one or more processors 700 implementing the process as described herein may be used to control a device 702, such as by causing a voltage to be applied. In another aspect, the system performs a physical action based on the graph produced by the network. In this aspect, the voltages applied to the quantum dot device (with gate defined semiconductor quantum dots) can be adjusted so that the quantum dot device is appropriately biased for usage as a spin qubit (i.e., the voltages are such that one electron is trapped and well isolated). This information is contained in and easily extracted from the predicted graph.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for pattern recognition and graph extraction, the system comprising:
one or more processors and associated memory, the memory being a non-transitory computer-readable medium having executable instructions encoded thereon, such that upon execution of the instructions, the one or more processors perform operations of:
obtaining data from a quantum dot device having gate defined semiconductor quantum dots;
generating an image with pixel-level coordinates from the data;
receiving graph annotations of the image;
processing, with a deep network, the image and pixel-level coordinates to generate a predicted graph;
comparing the predicted graph to the graph annotations to generate a loss;
optimizing the deep network by updating parameters in the deep network based on the loss;
processing, with the optimized deep network, the image with pixel-level coordinates to generate an optimized predicted graph;
identifying, with the optimized predicted graph, operational voltages to apply to the quantum dot device; and
applying the operational voltages to the quantum dot device.

2. The system as set forth in claim 1, wherein the operational voltages as applied to the quantum dot device are adjusted to bias for usage as a spin qubit.

3. A computer program product for pattern recognition and graph extraction, the computer program product comprising:
a non-transitory computer-readable medium having executable instructions encoded thereon, such that upon execution of the instructions by one or more processors, the one or more processors perform operations of:
obtaining data from a quantum dot device having gate defined semiconductor quantum dots;
generating an image with pixel-level coordinates from the data;
receiving graph annotations of the image;
processing, with a deep network, the image and pixel-level coordinates to generate a predicted graph;
comparing the predicted graph to the graph annotations to generate a loss;
optimizing the deep network by updating parameters in the deep network based on the loss;
processing, with the optimized deep network, the image with pixel-level coordinates to generate an optimized predicted graph;
identifying, with the optimized predicted graph, operational voltages to apply to the quantum dot device; and
applying the operational voltages to the quantum dot device.

4. The computer program product as set forth in claim 3, wherein the operational voltages as applied to the quantum dot device are adjusted to bias for usage as a spin qubit.

5. A computer implemented method for pattern recognition and graph extraction, the method comprising an act of:
causing one or more processors to execute instructions encoded on a non-transitory computer-readable medium, such that upon execution, the one or more processors perform operations of:
obtaining data from a quantum dot device having gate defined semiconductor quantum dots;
generating an image with pixel-level coordinates from the data;
receiving graph annotations of the image;
processing, with a deep network, the image and pixel-level coordinates to generate a predicted graph;
comparing the predicted graph to the graph annotations to generate a loss;
optimizing the deep network by updating parameters in the deep network based on the loss;
processing, with the optimized deep network, the image with pixel-level coordinates to generate an optimized predicted graph;
identifying, with the optimized predicted graph, operational voltages to apply to the quantum dot device; and
applying the operational voltages to the quantum dot device.

6. The method as set forth in claim 5, wherein the operational voltages as applied to the quantum dot device are adjusted to bias for usage as a spin qubit.

* * * * *